(12) United States Patent
Gil (10) Patent No.: US 10,992,128 B2
(45) Date of Patent: Apr. 27, 2021

(54) BATTERY REVERSE VOLTAGE PREVENTION SYSTEM AND METHOD

(71) Applicant: LG CHEM, LTD., Seoul (KR)

(72) Inventor: You Seob Gil, Daejeon (KR)

(73) Assignee: LG CHEM, LTD., Seoul (KR)

( * ) Notice: Subject to any disclaimer, the term of this patent is extended or adjusted under 35 U.S.C. 154(b) by 204 days.

(21) Appl. No.: 16/301,855

(22) PCT Filed: Oct. 27, 2017

(86) PCT No.: PCT/KR2017/011974
§ 371 (c)(1),
(2) Date: Nov. 15, 2018

(87) PCT Pub. No.: WO2018/093058
PCT Pub. Date: May 24, 2018

(65) Prior Publication Data
US 2019/0288506 A1    Sep. 19, 2019

(30) Foreign Application Priority Data
Nov. 21, 2016 (KR) .................. 10-2016-0155109

(51) Int. Cl.
*H02H 7/18*     (2006.01)
*H02J 7/00*     (2006.01)
*H02H 11/00*    (2006.01)

(52) U.S. Cl.
CPC .............. *H02H 7/18* (2013.01); *H02J 7/0034* (2013.01); *H02H 11/003* (2013.01)

(58) Field of Classification Search
CPC .. H02H 1/003; H02H 3/18; H02H 7/18; H02J 7/0034; H01M 10/425; H01M 2200/30; H01M 2220/20
See application file for complete search history.

(56) References Cited

U.S. PATENT DOCUMENTS 6,731,480 B2    5/2004   Chung
9,240,697 B2    1/2016   Xiang
(Continued)

FOREIGN PATENT DOCUMENTS

EP    0 918 389 A2    5/1999
JP    H10-70850 A     3/1998
(Continued)

OTHER PUBLICATIONS

International Search Report for PCT/KR2017/011974 (PCT/ISA/210) dated Feb. 2, 2018.
(Continued)

*Primary Examiner* — Rafael O De Leon Domenech
(74) *Attorney, Agent, or Firm* — Birch, Stewart, Kolasch & Birch LLP (57) ABSTRACT

The present invention relates to a battery reverse voltage prevention system, and more particularly, to a battery reverse voltage prevention system, which prevents current of a battery from flowing to a resistor by connecting an additional P-type channel MOSFET to a P-type channel MOSFET gate terminal in the related art in order to prevent opening/closing of a P-type channel MOSFET from being delayed due to a resistor installed to limit capacitance and dark current generated by the P-type channel MOSFET in a battery reverse voltage prevention system in the related art, which includes the P-type channel MOSFET, thereby reducing an opening/closing delay time of the P-type channel MOSFET in the related art.

13 Claims, 7 Drawing Sheets

(56) References Cited

U.S. PATENT DOCUMENTS

| | | | |
|---|---|---|---|
| 2010/0039160 A1 | 2/2010 | Ilkov | |
| 2011/0188164 A1* | 8/2011 | Desrochers | H02H 3/18 361/92 |
| 2012/0206110 A1 | 8/2012 | Nishida | |
| 2013/0193754 A1* | 8/2013 | Sugiyama | B60L 58/10 307/10.7 |
| 2014/0097798 A1 | 4/2014 | Han | |

FOREIGN PATENT DOCUMENTS

| | | |
|---|---|---|
| JP | 2003-37933 A | 2/2003 |
| JP | 2004-007901 A | 1/2004 |
| JP | 2004-208449 A | 7/2004 |
| JP | 2006-033900 A | 2/2006 |
| JP | 3956612 B2 | 8/2007 |
| JP | 2010-45780 A | 2/2010 |
| JP | 2012-222885 A | 11/2012 |
| JP | 2013-66321 A | 4/2013 |
| JP | 5522908 B2 | 6/2014 |
| JP | 2015-211540 A | 11/2015 |
| KR | 10-2014-0023697 A | 2/2014 |
| KR | 10-1395039 B1 | 5/2014 |

OTHER PUBLICATIONS

Extended European Search Report dated Jun. 27, 2019 for Application No. 17871838.3.

\* cited by examiner

BATTERY REVERSE VOLTAGE PREVENTION SYSTEM AND METHOD

TECHNICAL FIELD

This application claims priority to and the benefit of Korean Patent Application No. 10-2016-0155109 filed in the Korean Intellectual Property Office on Nov. 21, 2016, the entire contents of which are incorporated herein by reference.

The present invention relates to battery reverse voltage prevention system and method, and more particularly, to battery reverse voltage prevention system and method, which prevent current of a battery from flowing to a resistor by connecting an additional P-type channel MOSFET to a P-type channel MOSFET gate terminal in the related art in order to prevent opening/closing of a P-type channel MOSFET from being delayed due to a resistor installed to limit capacitance and dark current generated by the P-type channel MOSFET in a battery reverse voltage prevention system in the related art, which includes the P-type channel MOSFET, thereby reducing an opening/closing delay time of the P-type channel MOSFET in the related art.

BACKGROUND ART

A fuse which is a device that serves to protect a circuit or a system by cutting off overcurrent is widely used to prevent secondary damage such as circuit protection or fire in most circuits. While an environmental problem has been recently issued due to a concern about an environment, an interest in and a demand for environmentally friendly new renewable energy that can replace fossil fuels, which have a great impact on environmental issues increase. As a result, the need for environmentally friendly new renewable energy sources is increasing.

A secondary battery is one of energy sources that can replace the fossil fuels. The secondary battery is a battery which is semi-permanently used in a manner of charging electricity generated while current supplied from an external power source causes oxidation/reduction reactions of an anode and a cathode.

The secondary battery has a primary advantage that the secondary battery can drastically reduce the use of the fossil fuels and an advantage that no by-product is generated due to the use of energy. Further, unlike a primary battery which is used and wasted once, the secondary battery has an advantage that the secondary battery can be charged several times. Due to the advantages, the secondary battery is used in wide ranges including an electric vehicle (EV), a hybrid vehicle (HV), an energy storage system (ESS) or an uninterruptible power supply (UPS) system using a medium/large battery used for a house or an industry, and the like.

The secondary battery may not be applied when the secondary battery is used in a battery of a portable terminal, or the like requiring a low capacity, but in an environment requiring a high capacity such as the electric vehicle, the energy storage system, and the uninterruptible power supply, a plurality of unit secondary battery cells may be bonded and used.

When the plurality of secondary battery cells is bonded and used in the form of the battery, an abnormal operation such as overcurrent and overvoltage may cause the battery to overheat, resulting in a problem that the unit cell is swollen and damaged. To solve such a problem, it is necessary to measure and monitor various state information such as voltage, current, and temperature of each individual cell and prevent overcharging or overdischarging of the unit cell whenever the plurality of battery cells is bonded and used. In addition, a load needs to be prevented from being damaged by reverse voltage that may occur when an internal circuit of a battery pack is disconnected or damaged due to external environment or abnormal conditions.

In the related art, a diode or a MOSFET is used to protect the load from the reverse voltage of the battery. When the reverse voltage preventing system is constructed using the diode, a voltage drop of the voltage applied to an actual circuit occurs due to forward voltage of the diode occurs, which makes it difficult to operate in a circuit using low voltage. In addition, when the reverse voltage of the battery is prevented by using the MOSFET, the problem of the voltage drop is improved compared to the diode. However, in a case where the reverse voltage is momentarily applied in a normal situation, there is a problem in that the opening/closing of the MOSFET is delayed due to the resistor connected to prevent the capacitance and the dark current generated in the MOSFET, and as a result, the reverse voltage cannot be instantaneously blocked.

Therefore, it is necessary to protect the load from the reverse voltage of the battery more safely by blocking the reverse voltage which is instantaneously generated without delaying the opening/closing of the MOSFET in the reverse voltage preventing system using the MOSFET.

DETAILED DESCRIPTION OF THE INVENTION

Technical Problem

An object of the present invention is to provide battery reverse voltage prevention system and method, which prevent current of a battery from flowing to a resistor by connecting an additional P-type channel MOSFET to a P-type channel MOSFET gate terminal in the related art in order to prevent opening/closing of a P-type channel MOSFET from being delayed due to a resistor installed to limit capacitance and dark current generated by the P-type channel MOSFET in a battery reverse voltage prevention system in the related art, which includes the P-type channel MOSFET, thereby reducing an opening/closing delay time of the P-type channel MOSFET in the related art.

Technical Solution

According to an embodiment of the present invention, a battery reverse voltage prevention system may include a first metal oxide silicon field effect transistor (MOSFET) connecting a battery and a load and blocking reverse voltage applied from the battery; a resistor unit of which one side is connected with a gate terminal of the first MOSFET and the other side is connected with a ground terminal; and a second MOSFET connected with the resistor unit in parallel and when constant voltage is applied to the second MOSFET, the second MOSFET becomes an on state and current of the battery, which flows to the resistor unit is reduced to decrease an opening/closing delay time of the first MOSFET.

The first and second MOSFETs may be P-type channel MOSFETs.

A source terminal of the second MOSFET may be connected with a gate terminal of the first MOSFET, a drain terminal of the second MOSFET may be connected with the ground terminal, and the gate terminal of the second MOSFET may be connected with the battery.

When voltage of the battery is applied to the first MOSFET, the resistor unit may prevent the first MOSFET from malfunctioning due to capacitance generated between the gate terminal of the first MOSFET and the source terminal of the first MOSFET, and a value of the generated capacitance may be calculated based on Equation 1 below.

$$C = Q_{gs}/V_{gs} \qquad \text{<Equation 1>}$$

Herein, C represents the capacitance value, Qgs represents a gate-source electric amount of the first MOSFET, and Vgs represents gate-source voltage of the first MOS FET.

The opening/closing delay time of the first MOSFET may be calculated based on Equation 2 below.

$$\tau = R_S C \qquad \text{<Equation 2>}$$

Herein, τ represents the opening/closing delay time of the first MOSFET, $R_s$ represents the resistance value of the resistor unit, and C represents the capacitance value.

The battery reverse voltage prevention system may include: a first voltage correction unit connecting the gate terminal and the source terminal of the first MOSFET; and a second voltage correction unit connecting the gate terminal and the source terminal of the second MOSFET, and the first and second voltage correction units may correct gate-source voltage of the first and second MOSFETs, respectively to prevent failure and malfunction of the first and second MOSFETs.

The first and second voltage correction units may include one or more voltage regulator diodes.

The first and second voltage correction units may further include a resistor connecting the battery and the gate terminal of the second MOSFET and the resistor may prevent the second MOSFET from malfunctioning due to capacitance generated between the gate terminal and the source terminal of the second MOSFET.

The first and second MOSFETs may be N-type channel MOSFETs.

According to another embodiment of the present invention, a battery reverse voltage prevention method may include: connecting, by a first MOSFET, a battery and a load and blocking reverse voltage applied from the battery; connecting one side of a resistor unit with a gate terminal of the first MOSFET and connecting the other side with a ground terminal; connecting a second MOSFET with the resistor unit in parallel; and decreasing an opening/closing delay time of the first MOSFET by reducing current of the battery, which flows to the resistor unit as the second MOSFET becomes an on state when constant voltage is applied to the second MOSFET.

The first and second MOSFETs may be P-type channel MOSFETs.

The connecting in parallel may include connecting a source terminal of the second MOSFET with the gate terminal of the first MOSFET, connecting a drain terminal of the second MOSFET with the ground terminal, and connecting the gate terminal of the second MOSFET with the battery.

The connecting with the ground terminal may include malfunctioning, by the first MOSFET, due to capacitance generated between the gate terminal of the first MOSFET and the source terminal of the first MOSFET when voltage of the battery is applied to the first MOSFET, and a value of the generated capacitance may be calculated based on Equation 1 below.

$$C = Q_{gs}/V_{gs} \qquad \text{<Equation 1>}$$

Herein, C represents the capacitance value, Qgs represents gate-source voltage of the first MOSFET, and Vgs represents gate-source voltage of the first MOSFET.

The decreasing may include calculating the opening/closing delay time of the first MOSFET based on Equation 2 below.

$$\tau = R_S C \qquad \text{<Equation 2>}$$

Herein, τ represents the opening/closing delay time of the first MOSFET, $R_s$ represents the resistance value of the resistor unit, and C represents the capacitance value.

The battery reverse voltage prevention method may further include: connecting, by a first voltage correction unit, the gate terminal and the source terminal of the first MOSFET; connecting, by a second voltage correction unit, the gate terminal and the source terminal of the second MOSFET; and correcting, by the first and second voltage correction units, gate-source voltage of the first and second MOSFETs, respectively to prevent failure and malfunction of the first and second MOSFETs.

The preventing may include including one or more voltage regulator diodes.

Advantageous Effects

According to an aspect of the present invention, battery reverse voltage prevention system and method can be provided, which prevent current of a battery from flowing to a resistor by connecting an additional P-type channel MOSFET to a P-type channel MOSFET gate terminal in the related art in order to prevent opening/closing of a P-type channel MOSFET from being delayed due to a resistor installed to limit capacitance and dark current generated by the P-type channel MOSFET in a battery reverse voltage prevention system in the related art, which includes the P-type channel MOSFET, thereby reducing an opening/closing delay time of the P-type channel MOSFET in the related art.

BEST MODE

The present invention will be described below in detail with reference to the accompanying drawings. Herein, the repeated description and the detailed description of publicly-known function and configuration that may make the gist of the present invention unnecessarily ambiguous will be omitted. Embodiments of the present invention are provided for more completely describing the present invention to those skilled in the art. Accordingly, shapes, sizes, and the like of elements in the drawings may be exaggerated for clearer explanation.

Throughout the specification, unless explicitly described to the contrary, a case where any part "includes" any component will be understood to imply the inclusion of stated components but not the exclusion of any other component.

In addition, the term "unit" disclosed in the specification means a unit that processes at least one function or operation, and the unit may be implemented by hardware or software or a combination of hardware and software.

Figure 1:
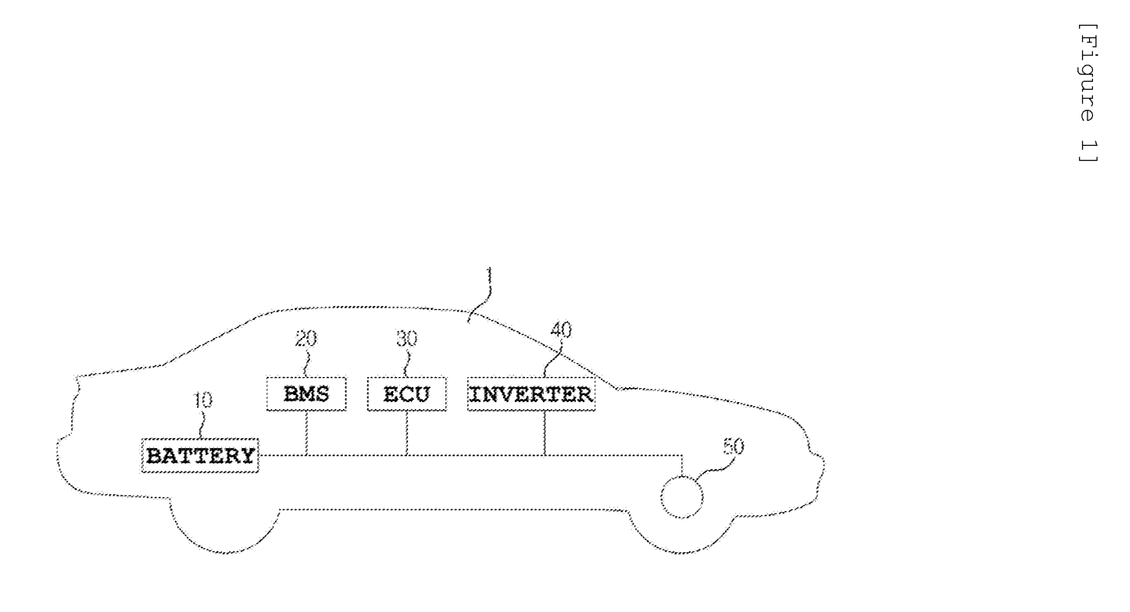
FIG. 1 is a diagram schematically illustrating an electric vehicle to which a battery reverse voltage prevention system may be applied according to an embodiment of the present invention.

FIG. 1 is a diagram schematically illustrating an electric vehicle to which a battery reverse voltage prevention system may be applied according to an embodiment of the present invention.

In FIG. 1, an example in which the system 100 for preventing battery reverse voltage according to the embodiment of the present invention is applied to an electric vehicle 1 is illustrated, but the system 100 for preventing battery reverse voltage according to the embodiment of the present invention may be applied to all technical fields to which a secondary battery such as a home or industrial energy storage system (ESS), or an uninterruptible power supply (UPS) system may be applied in addition to the electric vehicle 1.

The electric vehicle 1 may include a battery 10, a battery management system (BMS) 20, an electronic control unit (ECU) 30, an inverter 40, and a motor 50.

The battery 10 may be an electric energy source that drives the electric vehicle 1 by providing driving force to the motor 50 described below. The battery 10 may be charged or discharged by the inverter 40 described below by driving the motor 50 and/or an internal combustion engine (not illustrated). Herein, a type of battery 10 is not particularly limited and the battery 10 may be constituted by, for example, a lithium ion battery, a lithium polymer battery, a nickel cadmium battery, a nickel hydrogen battery, a nickel zinc battery, and the like.

Further, the battery 10 is formed by a battery pack in which a plurality of battery cells is connected in series and/or in parallel. In addition, the battery 10 may include one or more battery packs.

The BMS 20 may estimate the state of the battery 10 and manage the battery 10 by using estimated state information. For example, the BMS 20 may estimate and manage state information of the battery 10, which includes a state of charging (SOC), a state of health (SOH), a maximum input/output power allowance amount, output voltage, and the like of the battery 10. In addition, the BMS 20 may control charging or discharging of the battery 10 by using the state information and furthermore, estimate a replacement time of the battery 10.

The BMS 20 may include the system 100 for preventing battery reverse voltage according to the embodiment of the present invention, which is described below or may operate in connection with the system 100 for preventing battery reverse voltage. When the reverse voltage of the battery 10 is generated, the BMS 20 may protect a load from the reverse voltage of the battery 10 by using the battery P-type channel MOSFET. Further, by reducing the opening/closing delay time of a main P-type channel MOSFET through an additional P-type channel MOSFET connected to a gate terminal of the main P-type channel MOSFET, the reverse voltage may be cut off quickly.

The ECU 30 may be an electronic control device that controls the state of the electric vehicle 1. For example, the ECU 30 may determine a torque degree based on information such as an accelerator, a brake, a speed, and the like and control an output of the motor 50 according to the torque information. Further, the ECU 30 may transmit a control signal to the inverter 40 so that the battery 10 is charged or discharged by the BMS 20.

The inverter 40 allows the battery 10 to be charged or discharged based on the control signal of the ECU 30.

The motor 50 may drive the electric vehicle 1 based on control information (e.g., torque information) transferred from the ECU 30 by using electric energy of the battery 10.

Hereinafter, the system 100 for preventing battery reverse voltage in the related art will be described with reference to FIG. 2.

Figure 2:
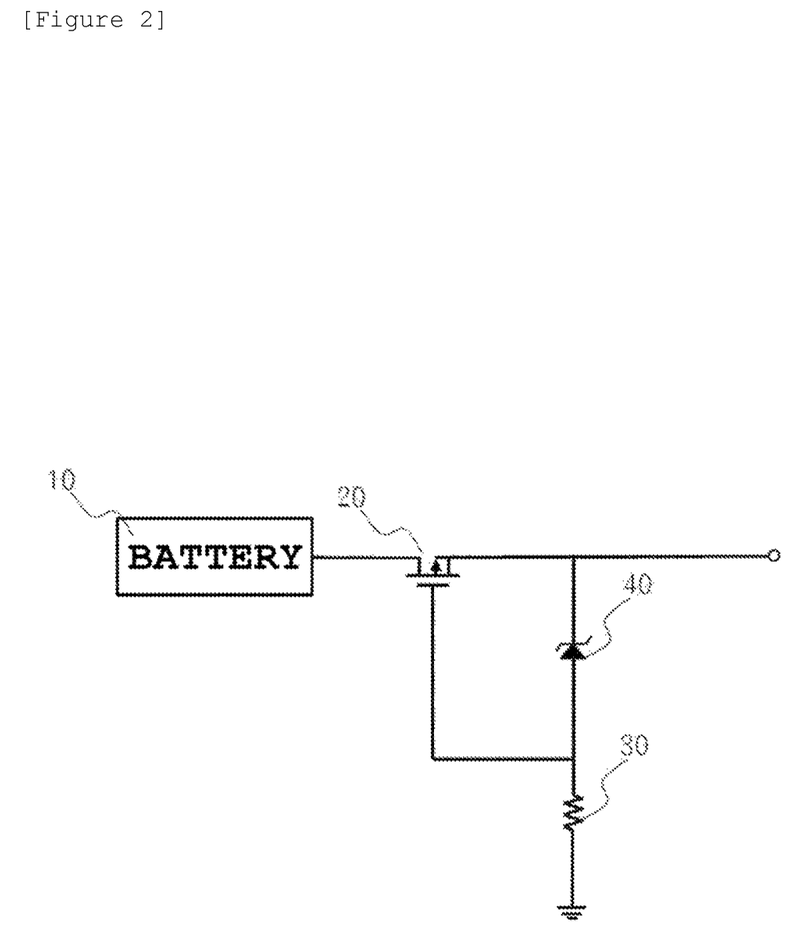
FIG. 2 is a diagram schematically illustrating a battery reverse voltage prevention system in the related art, which includes a P-type channel MOSFET.

FIG. 2 is a diagram schematically illustrating a battery reverse voltage prevention system in the related art, which includes a P-type channel MOSFET.

Referring to FIG. 2, the battery reverse voltage prevention system in the related art protects the load from the reverse voltage of the battery 10 by using one P-type channel MOSFET 110. When constant voltage of the battery 10 is applied to a P-type channel MOSFET 20, a capacitance is generated between a source terminal and a gate terminal of the P-type channel MOSFET 20. Since the generated capacitance may interfere with a normal operation of the P-type channel MOSFET 20, the battery reverse voltage prevention system in the related art limits the capacitance by connecting a resistor 30 to the gate terminal. Further, in order to prevent the P-type channel MOSFET 20 from failing due to voltage between a source terminal and the gate terminal of the P-type channel MOSFET 20, a Zener diode 40 for voltage correction is included. However, in the battery reverse voltage prevention system in the related art, there is a problem in that the opening/closing delay time when opening/closing of the P-type channel MOSFET 20 is delayed due to the resistor 30 is generated and the reverse voltage of the battery 10 may not be blocked quickly due to the problem, and as a result, the load may be damaged. Therefore, there is a need to improve the problems.

Hereinafter, a system 100 for preventing battery reverse voltage according to an embodiment of preset invention will be described with reference to FIGS. 3 to 5.

Figure 3:
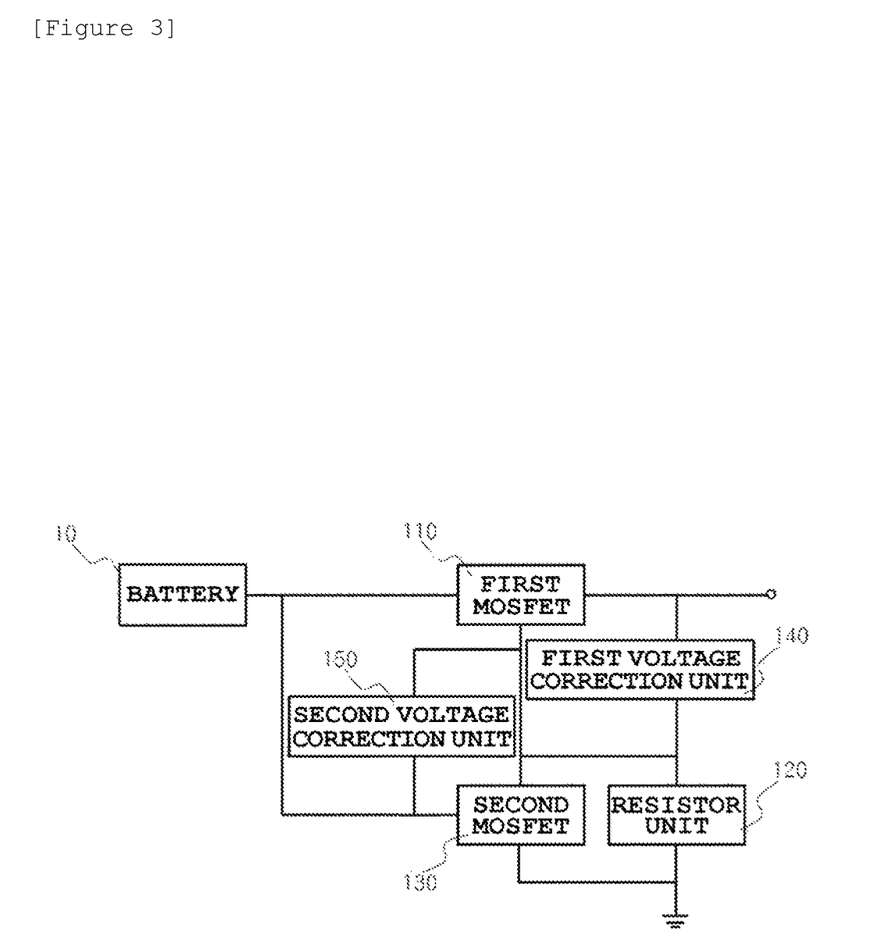
FIGS. 3 and 4 are diagrams schematically illustrating a battery reverse voltage prevention system according to an embodiment of the present invention.
Figure 4:
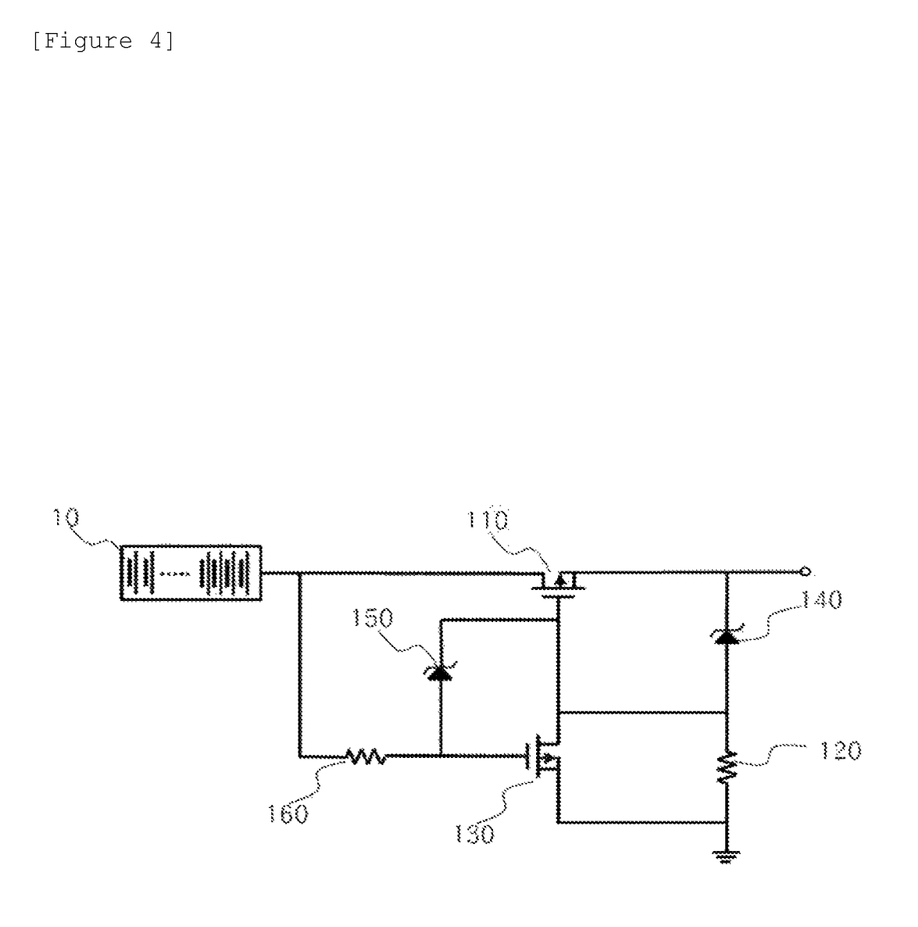

FIGS. 3 and 4 are diagrams schematically illustrating a battery reverse voltage prevention system according to an embodiment of the present invention.

Referring to FIGS. 3 and 4, the system 100 for preventing battery reverse voltage according to the embodiment of the present invention may be configured to include a first metal oxide silicon field effect transistor (MOSFET) 110, a resistor unit 120, and a second MOSFET 130.

The system 100 for preventing battery reverse voltage, which are illustrated in FIGS. 3 and 4 follows the embodiment and constituent elements thereof are not limited to the embodiment illustrated in FIGS. 3 and 4 and as necessary, the constituent elements may be added, modified, or deleted.

The first MOSFET 110 may connect the battery 10 and the load and block the reverse voltage applied from the battery. Herein, the first MOSFET 110 may be the P-type channel MOSFET. In the P-type channel MOSFET, a carrier forming a channel in a MOS is a hole. Since the P-type channel MOSFET is generally easier to fabricate than an N-type channel MOSFET, a low-cost battery reverse voltage preventing system 100 may be fabricated.

When the constant voltage is applied to the first MOSFET 110, the source terminal of the first MOSFET 110 is higher than the gate terminal by a predetermined voltage and the first MOSFET 110 is turned on, and as a result, current may flow from a drain terminal to the source terminal of the first MOSFET 110. For example, the predetermined voltage may be 3V to 7V and when a voltage difference between the source terminal and the gate terminal of the first MOSFET 110 is between 3V and 7V, the first MOSFET 110 may be turned on.

In addition, when the reverse voltage is applied to the first MOSFET 110, the gate terminal of the first MOSFET 110 becomes higher than the source terminal by a predetermined voltage and in this case, the first MOSFET 110 may be turned off.

When the first MOSFET 110 is used as a switching device, the capacitance may be generated between the drain terminal, the source terminal, and the gate terminal of the first MOSFET.

In this case, a capacitance value may be calculated from Equation 1 below.

$$C = Q_{gs}/V_{gs} \qquad \text{<Equation 1>}$$

Herein, C represents the capacitance value, Qgs represents a gate-source electric amount of the first MOSFET, and Vgs represents gate-source voltage of the first MOSFET.

As described above, when the voltage is applied to the first MOSFET 110, the capacitance value is generated between the source terminal and the gate terminal of the first MOSFET 110. The capacitance generated as such may interfere with the normal operation of the first MOSFET 110. The resistor unit 120 described below limits the capacitance so that the first MOSFET 110 may operate normally.

When the voltage of the battery 10 is applied to the first MOSFET 110, the resistor unit 120 may prevent the first MOSFET from malfunctioning due to the capacitance generated between the gate terminal of the first MOSFET 110 and the source terminal of the first MOSFET. To this end, one side of the resistor unit 120 may be connected to the gate terminal of the first MOSFET 110 and the other side thereof may be connected to a ground terminal. For example, when the battery reverse voltage preventing system 100 is intended to be used in an environment where a transition time is short and PWM control is performed at a high frequency, the current due to charging/discharging of the capacitance may not be ignored. In this case, a driving device may be broken or malfunction. Accordingly, by connecting the resistor unit 120 to the gate terminal of the first MOSFET 110, the capacitance and current may be limited, thereby preventing malfunction and failure of the first MOSFET 110.

However, when the battery reverse voltage preventing system 100 including the first MOSFET 110 is used in an environment in which the switching device needs to be rapidly transited, a resistance value of the resistor unit 120 needs to be increased. However, when the resistance value of the resistor unit 120 increases, the opening/closing time of the first MOSFET 110 may be delayed.

In this case, the opening/closing delay time of the first MOSFET 110 may be calculated from Equation 2 below.

$$\tau = R_S C \qquad \text{<Equation 2>}$$

Herein, τ represents the opening/closing delay time of the first MOSFET, $R_s$ represents the resistance value of the resistor unit, and C represents the capacitance value.

As described above, as the value of the resistor unit 120 increases, the opening/closing delay time of the first MOSFET 110 may increase in proportion to the resistance value of the resistor unit 120 and it may be difficult to use the first MOSFET 110 in an environment in which as opening/closing is delayed, the switching device needs to be rapidly transited.

The second MOSFET 130 may be connected with the resistor unit 120 in parallel and may reduce the opening/closing delay time. The second MOSFET 130 may also be the P-type channel MOSFET similarly to the first MOSFET 110.

Further, the source terminal of the second MOSFET 130 may be connected with the gate terminal of the first MOSFET 110, the drain terminal of the second MOSFET 130 may be connected with the ground terminal, and the gate terminal of the second MOSFET 130 may be connected with the battery 10.

When the constant voltage is applied to the first MOSFET 110, the gate terminal of the first MOSFET 110 has a lower potential than the source terminal, and as a result, the second MOSFET 130 is turned on. The second MOSFET 130 which is in the on state has a resistance value lower than the resistance value of the resistor unit 120 and most of the current that flows through the resistor unit 120 to the ground terminal may flow to the ground terminal through the second MOSFET 130. That is, when the constant voltage is applied to the second MOSFET 130, the second MOSFET 130 is turned on, thereby reducing the current of the battery which flows to the resistor unit 120. Therefore, the same effect as lowering the resistance value of the resistor unit 120 or not connecting the resistor unit 120 may be achieved.

As described above, when the same effect as lowering the resistance value of the resistor unit 120 or not connecting the resistor unit 120 is shown, the opening/closing delay time of the first MOSFET 120 may be reduced or eliminated based on Equation 2 above.

Figure 5:
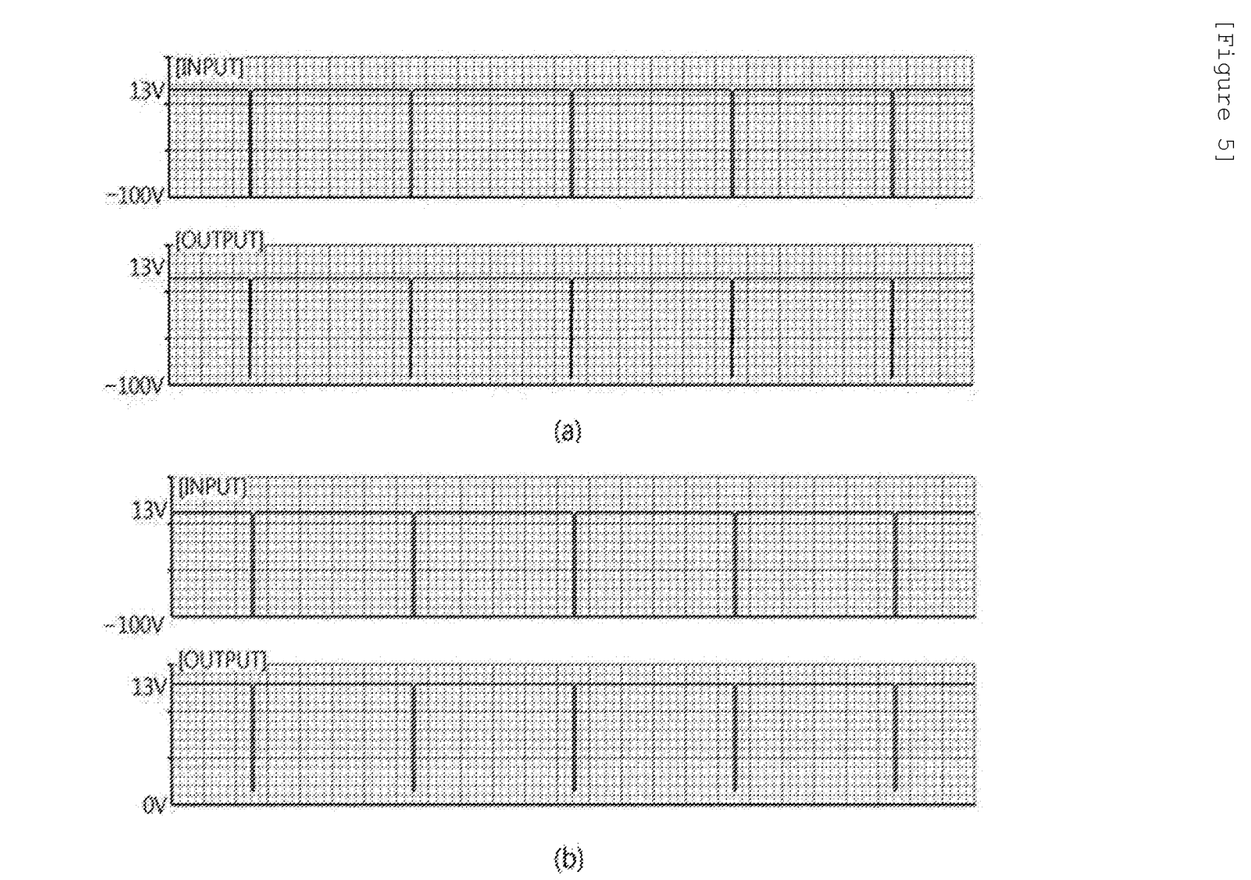
FIG. 5 is a diagram comparing an opening/closing delay time graph of a P-type channel MOSFET when using the battery reverse voltage prevention system in the related art and the opening/closing delay time graph of the P-type channel MOSFET when using the battery reverse voltage prevention system according to the embodiment of the present invention.

FIG. 5 is a diagram comparing an opening/closing delay time graph of a P-type channel MOSFET when using the battery reverse voltage prevention system in the related art and the opening/closing delay time graph of the P-type channel MOSFET when using the battery reverse voltage prevention system according to the embodiment of the present invention.

More specifically, referring to FIG. 5, when the battery reverse voltage preventing system in the related art, which uses only the first MOSFET 110 is used, the opening/closing delay time is generated due to the resistance value of the resistor unit 120 and as illustrated in FIG. 5(a), the reverse voltage is not normally blocked and some reverse voltage is applied to the load. As illustrated in FIG. 5(b), when the second MOSFET 130 is used together with the first MOSFET 110, the current which flows through the resistor unit 120 is reduced to achieve an effect of decreasing the resistance value of the resistor unit 120 or not connecting the resistor unit 120, thereby reducing the opening/closing delay time.

Additionally, the battery reverse voltage preventing system 100 according to the embodiment of the present invention may be configured to include a first voltage correction unit 140 and a second voltage correction unit 150.

The first voltage correction unit 140 may connect the gate terminal and the source terminal of the first MOSFET 110 and the second voltage correction unit 150 may connect the gate terminal and the source terminal of the second MOSFET.

The first voltage correction unit 140 and the second voltage unit 150 correct the gate-source voltage of the first MOSFET 110 and the second MOSFET 130, respectively to prevent the failure and the malfunction of the first MOSFET 110 and the second MOSFET 130. When high voltage of the battery 10 is applied to the first MOSFET 110 and the second MOSFET 130, the high voltage may be applied between the gate terminal and the source terminal. The high voltage may damage the first MOSFET 110 and the second MOSFET 130, so that the reverse voltage may not be normally prevented. By connecting the first voltage correction unit 140 and the second voltage correction unit 150 between the gate terminal and the source terminal of the first MOSFET 110 and between the gate terminal and the source terminal of the second MOSFET 130, it is possible to prevent the failure and the malfunction by correcting the high voltage. As an example, the first voltage correction unit 140 and the second voltage correction unit 150 may be one or more voltage regulator diodes.

In another embodiment, the first MOSFET 110 and the second MOSFET 130 may be more reliably protected by using both one or more regulator diodes or general diodes.

Figure 6:
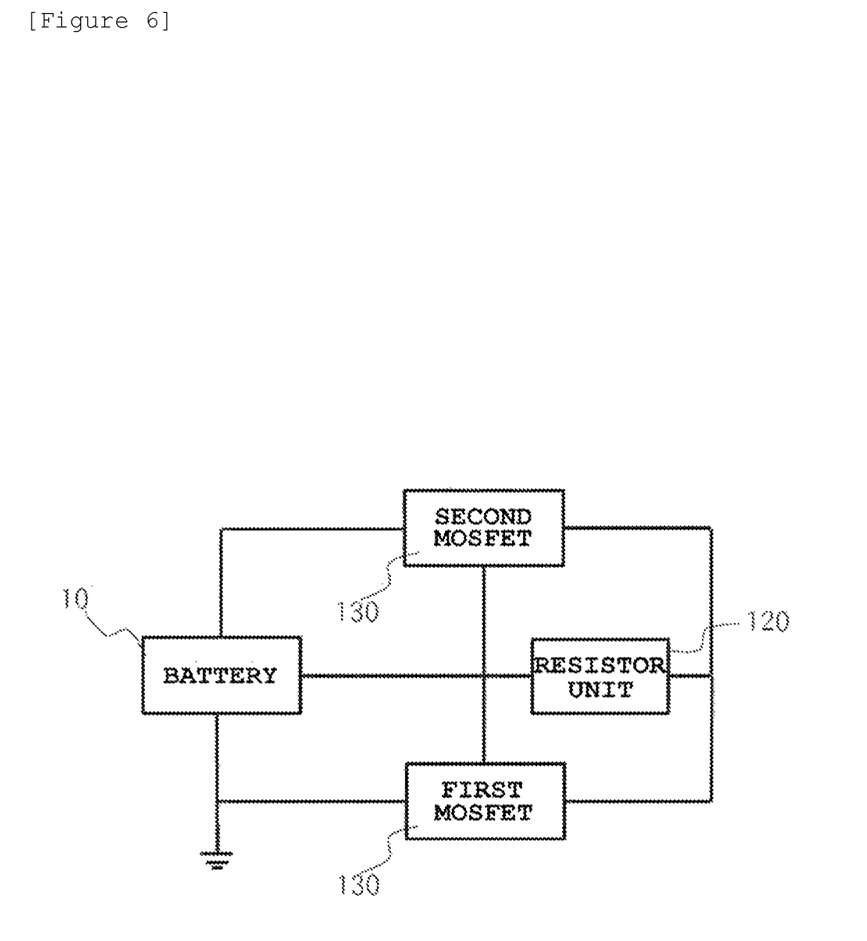
FIG. 6 is a diagram schematically illustrating a battery reverse voltage prevention system according to another embodiment of the present invention.

FIG. 6 is a diagram schematically illustrating a battery reverse voltage prevention system according to another embodiment of the present invention.

Referring to FIG. 6, the first MOSFET 110 and the second MOSFET 130 may be N-type channel MOSFETs in the battery reverse voltage preventing system 100 according to another embodiment of the present invention. In this case, the gate terminal of the first MOSFET 110 and the battery may be connected and the drain terminal may be connected with the ground terminal. Further, similarly to the case where the first MOSFET 110 is the P-type channel MOSFET, the resistor unit 130 may be connected to the gate terminal. In this case, when the constant voltage of the battery 10 is applied to the first MOSFET 110, a potential of the gate terminal of the first MOSFET 110 is higher than that of the source terminal, and as a result, the first MOSFET 110 may be transited to an on state. When the reverse voltage of the battery 10 is applied to the first MOSFET 110, the potential of the gate terminal of the first MOSFET 110 is lower than that of the source terminal, and as a result, the first MOSFET 110 may be transited to an off state. In this case, the resistor unit 120 may be connected to the resistor unit of the first MOSFET 110 to limit the capacitance generated by the first MOSFET 110 and the second MOSFET 130 may be connected to the resistor unit 120 in parallel in order to reduce the opening/closing delay time of the first MOSFET 110 similarly to the case where the first and second MOSFETs 110 and 130 are the P-type channel MOSFETs. When the constant voltage of the battery 10 is applied to the second MOSFET 130 connected with the resistor unit 120, the second MOSFET 130 is transited to the on state to reduce the current of the battery 10, which flows to the resistor unit 120, thereby achieving an effect of reducing the resistance value of the resistor unit 120 or not connecting the resistor unit 120. Thereafter, when the reverse voltage of the battery 10 is applied, the opening/closing delay time is reduced due to the reduced resistance value of the resistor unit 120 so that the on/off state of the first MOSFET 110 is transited more quickly to protect the load from the reverse voltage of the battery 10.

Figure 7:
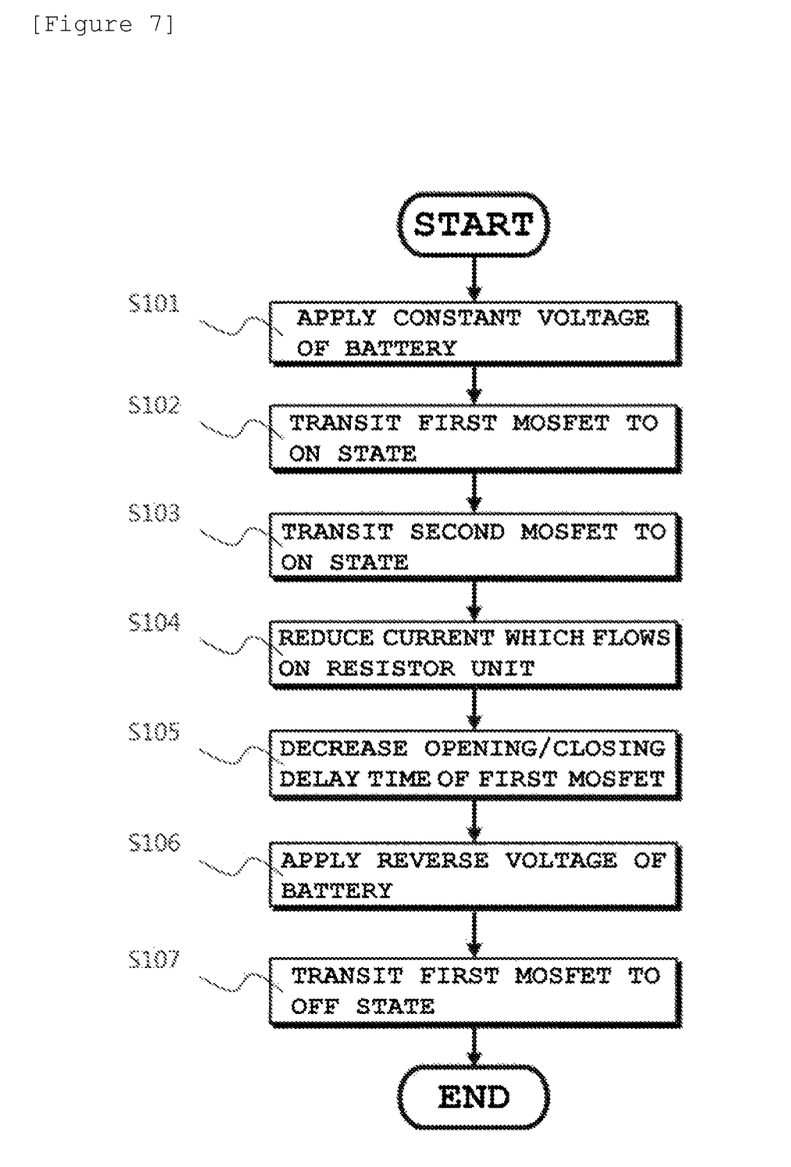
FIG. 7 is a flowchart for describing a battery reverse voltage prevention method according to an embodiment of the present invention.

FIG. 7 is a flowchart for describing a battery reverse voltage prevention method according to an embodiment of the present invention.

Referring to FIG. 7, when the method (S100) for preventing battery reverse voltage according to the embodiment of the present invention is disclosed, the constant voltage of the battery is applied to the first MOSFET (S101). The first MOSFET is transited to the on state due to the constant voltage of the battery applied in step S101 (S102). In steps S101 and S102, the capacitance is generated among the drain terminal, the source terminal, and the gate terminal of the first MOSFET due to the constant voltage of the battery. The capacitance may interfere with the normal operation of the first MOSFET, thereby limiting the capacitance by connecting the resistor unit to the gate terminal of the first MOSFET. In order to prevent the opening/closing delay time of the first MOSFET from being generated due to the resistor unit, the second MOSFET connected in parallel to the resistor unit is transited to the on state while the first MOSFET is transited to the on state in step S102 (S103). When the second MOSFET is turned on in step S103, the current which flows to the resistor unit is reduced or eliminated, thereby reducing the opening/closing delay time of the first MOSFET (S105). Thereafter, when the reverse voltage of the battery is applied (S106), the first MOSFET is not delayed and is quickly transited to the off state, thereby protecting the load from the reverse voltage of the battery (S107).

The aforementioned battery reverse voltage preventing method has been described with reference to the flowcharts presented in the drawings. The method has been shown and described by a series of blocks for easy description, but it is to be understood that the present invention is not limited to the order of the blocks, and that some blocks may be generated in different orders from and concurrently with other blocks as shown and described in the present specification, and various other branches, flow paths, and orders of blocks may be implemented to achieve the same or similar result. In addition, all illustrated blocks may not be required for the implementation of the method described in the present specification.

Hereinabove, a specific embodiment of the present invention has been illustrated and described, but the technical spirit of the present invention is not limited to the accompanying drawings and the described contents and it is apparent to those skilled in the art that various modifications of the present invention can be made within the scope without departing from the spirit of the present invention and it will be regarded that the modifications are included in the claims of the present invention without departing from the spirit of the present invention.

The invention claimed is:

1. A battery reverse voltage prevention system, the system comprising:
   a first metal oxide silicon field effect transistor (MOSFET) connecting a battery and a load and blocking a reverse voltage applied from the battery;
   a resistor unit of which one side is connected with a gate terminal of the first MOSFET and the other side is connected with a ground terminal; and
   a second MOSFET connected with the resistor unit in parallel,
   wherein when constant voltage is applied to the second MOSFET, the second MOSFET is turned on and current of the battery, which flows to the resistor unit, is reduced to decrease an opening/closing delay time of the first MOSFET, and
   wherein the first and second MOSFETs are P-type channel MOSFETs.

2. The system of claim 1, wherein a source terminal of the second MOSFET is connected with the gate terminal of the first MOSFET, a drain terminal of the second MOSFET is connected with the ground terminal, and a gate terminal of the second MOSFET is connected with the battery.

3. The system of claim 1, wherein when voltage of the battery is applied to the first MOSFET, the resistor unit prevents the first MOSFET from malfunctioning due to capacitance generated between the gate terminal of the first MOSFET and a source terminal of the first MOSFET, and
a value of the generated capacitance is calculated based on Equation 1 below, $$C=Q_{gs}/V_{gs} \qquad \text{<Equation 1>}$$

herein, C represents a capacitance value, $Q_{gs}$ represents a gate-source electric amount of the first MOSFET, and $V_{gs}$ represents gate-source voltage of the first MOSFET.

4. The system of claim 3, wherein the opening/closing delay time of the first MOSFET is calculated based on Equation 2 below, $$\tau=R_S C \qquad \text{<Equation 2>}$$

herein, τ represents the opening/closing delay time of the first MOSFET, $R_s$ represents the resistance value of the resistor unit, and C represents the capacitance value.

5. The system of claim 1, further comprising:
a first voltage correction unit connecting the gate terminal and a source terminal of the first MOSFET; and
a second voltage correction unit connecting a gate terminal and a source terminal of the second MOSFET,
wherein the first and second voltage correction units correct a gate-source voltage of the first and second MOSFETs, respectively, to prevent failure and malfunction of the first and second MOSFETs.

6. The system of claim 5, wherein the first and second voltage correction units include one or more regulator diodes.

7. A battery reverse voltage prevention method, the method comprising:
connecting, by a first MOSFET, a battery and a load and blocking reverse voltage applied from the battery;
connecting one side of a resistor unit with a gate terminal of the first MOSFET and connecting the other side with a ground terminal;
connecting a second MOSFET with the resistor unit in parallel; and
applying a constant voltage to the second MOSFET to turn on the second MOSFET and to decrease an opening/closing delay time of the first MOSFET by reducing current of the battery that flows to the resistor unit,
wherein the first and second MOSFETs are P-type channel MOSFETs.

8. The method of claim 7, wherein the connecting in parallel includes:
connecting a source terminal of the second MOSFET with the gate terminal of the first MOSFET,
connecting a drain terminal of the second MOSFET with the ground terminal, and
connecting a gate terminal of the second MOSFET with the battery.

9. The method of claim 7, wherein the connecting with the ground terminal includes:
malfunctioning, by the first MOSFET, due to capacitance generated between the gate terminal of the first MOSFET and a source terminal of the first MOSFET when voltage of the battery is applied to the first MOSFET, and
a value of the generated capacitance is calculated based on Equation 1 below, $$C=Q_{gs}/V_{gs} \qquad \text{<Equation 1>}$$

herein, C represents a capacitance value, $Q_{gs}$ represents a gate-source electric amount of the first MOSFET, and $V_{gs}$ represents gate-source voltage of the first MOSFET.

10. The method of claim 9, wherein the applying the constant voltage to the second MOSFET to turn on the second MOSFET and to decrease an opening/closing delay time includes calculating the opening/closing delay time of the first MOSFET based on Equation 2 below, $$\tau=R_S C \qquad \text{<Equation 2>}$$

herein, τ represents an opening/closing delay time of the first MOSFET, $R_s$ represents the resistance value of the resistor unit, and C represents the capacitance value.

11. The method of claim 7, further comprising:
connecting, by a first voltage correction unit, the gate terminal and a source terminal of the first MOSFET;
connecting, by a second voltage correction unit, a gate terminal and a source terminal of the second MOSFET; and
correcting, by the first and second voltage correction units, a gate-source voltage of the first and second MOSFETs, respectively, to prevent failure and malfunction of the first and second MOSFETs.

12. The method of claim 11, wherein the first voltage correction unit and the second voltage correction unit includes one or more regulator diodes.

13. A battery reverse voltage prevention system, the system comprising:
a first metal oxide silicon field effect transistor (MOSFET) connecting a battery and a load and blocking a reverse voltage applied from the battery;
a resistor unit of which one side is connected with a gate terminal of the first MOSFET and the other side is connected with a ground terminal; and
a second MOSFET connected with the resistor unit in parallel,
wherein when constant voltage is applied to the second MOSFET, the second MOSFET is turned on and current of the battery, which flows to the resistor unit, is reduced to decrease an opening/closing delay time of the first MOSFET, and
wherein a source terminal of the second MOSFET is connected with the gate terminal of the first MOSFET, a drain terminal of the second MOSFET is connected with the ground terminal, and a gate terminal of the second MOSFET is connected with the battery.

* * * * *